Figure 1:
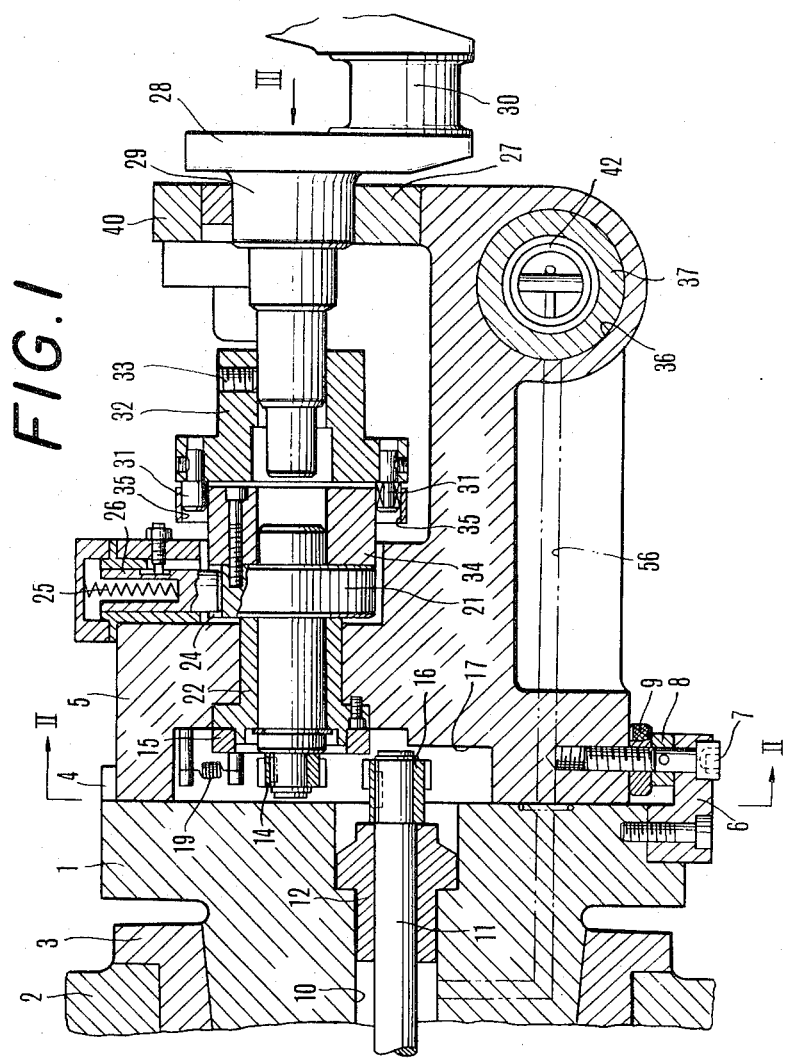

United States Patent
Okada

[15] 3,680,876
[45] Aug. 1, 1972

[54] INDEXING DEVICE FOR A CRANKSHAFT
[72] Inventor: Hiroshi Okada, Kariya, Japan
[73] Assignee: Toyoda Koki Kabushiki Kaisha, Kariya-shi, Aichi-ken, Japan
[22] Filed: Dec. 17, 1970
[21] Appl. No.: 99,021

[30] Foreign Application Priority Data
Feb. 26, 1970 Japan..........................45/16487

[52] U.S. Cl.................279/5, 51/105 SP, 51/237 CS, 82/40 A, 279/6
[51] Int. Cl. ............................................B23b 31/36
[58] Field of Search ....82/40 A; 279/5, 6; 51/105 SP, 51/237 CS

[56] References Cited
UNITED STATES PATENTS
3,583,108  6/1971  Oishi et al. .................51/237 CS Primary Examiner—Francis S. Husar
Attorney—Wenderoth, Lind & Ponack

[57] ABSTRACT

An indexing device for a crankshaft comprises a chuck body radially adjustably mounted on a drive spindle for varying crankshaft eccentricities, an index plate carries a first gear and the spindle carries a second gear, these gears being brought into an operative relationship by an interposed idler gear carried on a movable member adapted to be moved by manual operation so as to move the idler gear out of meshing engagement when the index plate is moved in accordance with a different eccentricity of a crankshaft.

4 Claims, 4 Drawing Figures

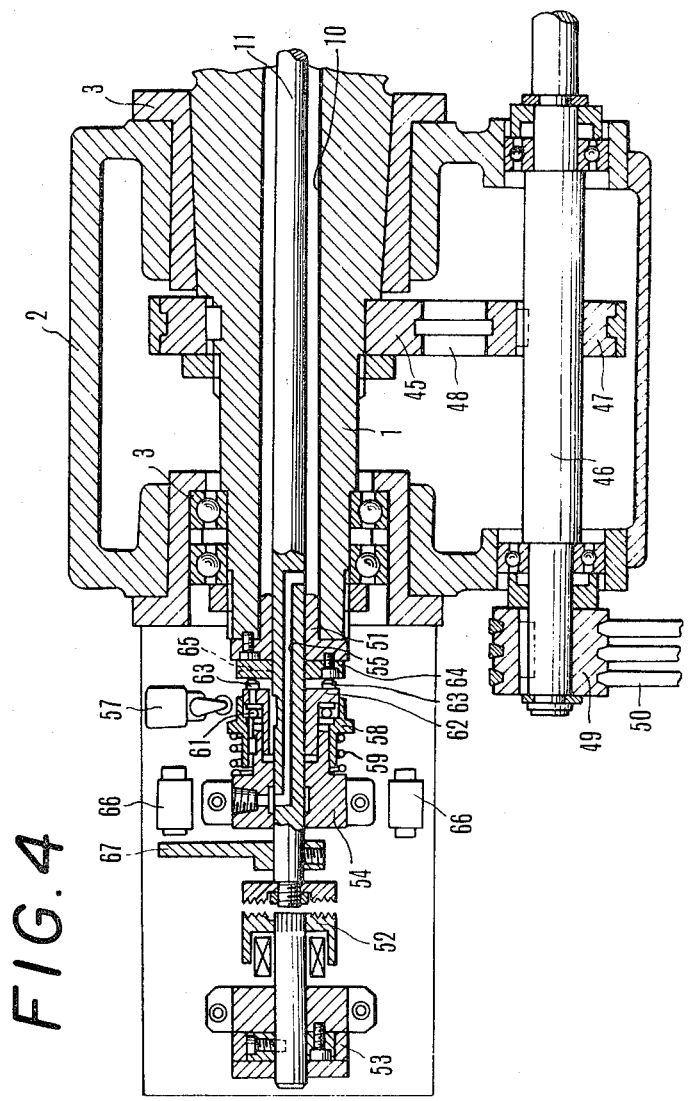

INDEXING DEVICE FOR A CRANKSHAFT

The invention relates to an indexing device for a crankshaft having a plurality of crank pins located at different phase angles.

In a crankpin grinding machine, a crankshaft is held by a chuck mounted on the front surface of a drive spindle so that the axis of the journal portion of the crankshaft is eccentric with respect to the axis of the drive spindle. At one end of the crankshaft is rotatably mounted an index plate aligned with the axis of the journal portion. Rotation of the index plate provides an indexing such that the axis of one of the crank pins moves into alignment with the axis of the drive spindle. It will then be seen that it is necessary to move the index plate radially of the spindle by an amount corresponding of the eccentricity of a crankshaft in order to indexably hold the crankshafts having varying eccentricities. The index plate is arranged for indexing rotation by an indexing drive means through a second gear mounted on and aligned with the spindle and a first gear mounted on and aligned with the index plate. A chuck having such a gearing heretofore includes an idler gear interposed between and meshing with the first and second gears. The idler gear is guided for its movement by a guide groove whenever the index plate is moved for adjustment so that the meshing engagement among these three gears may be always maintained. However, with this arrangement, because the three gears are maintained in meshing engagement, relative rotation occurs between the first and second gears when the index plate is adjustably moved, thereby causing a phase error between the index plate and the indexing drive means which results in a need for re-adjustment of an indexing recognition mechanism.

It is a primary object of the invention to provide an indexing device having flexibility to accomodate crankshafts with varying eccentricities, that is, varying distances between the axes of the joural portion and crank pins.

It is another object of the invention to provide an indexing device for preventing a phase error between gears used to provide an indexing rotation of an index plate when the index plate is moved for adjustment corresponding to varying eccentricities of the crankshaft.

Figure 2:
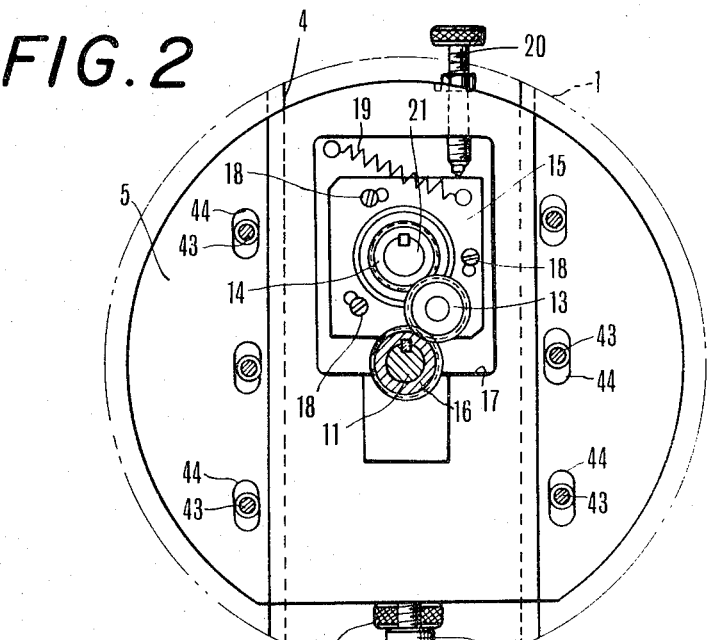
Figure 3:
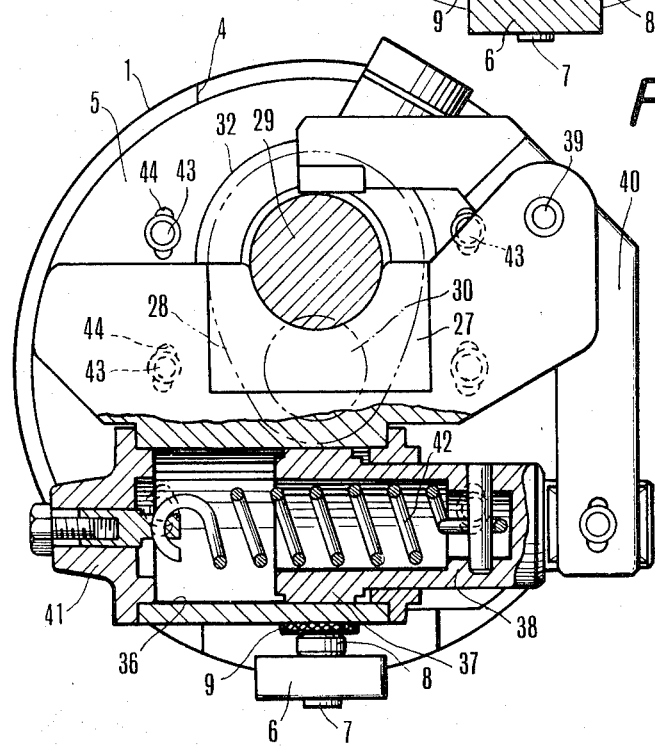

Above and further objects, features and advantages of the invention will become apparent from the following description of an embodiment thereof with reference to the attached drawings, in which:

FIG. 1 is a longitudinal sectional view of the essential part of the indexing device according to the invention, FIG. 2 is a sectional view taken along the line II—II of FIG. 1, FIG. 3 is a view, partly in section, in a direction indicated by the arrow III of FIG. 1, and FIG. 4 is a longitudinal sectional view of an indexing drive means for the chuck.

Referring to FIGS. 1 and 2, a drive spindle 1 is rotatably mounted on a headstock 2 by means of a bearing member 3 and is radially formed in its front surface with a guide groove 4, in which a chuck body 5 is received so as to be movable radially of the spindle 1. Secured to the bottom of the drive spindle 1 at the front thereof is a support member 6 in which an adjusting bolt 7 is rotatably fitted, the bolt 7 being restricted in the axial movement thereof by a set ring 8. The adjusting bolt 7 has its forward end in threadable engagement with the chuck body 5 for adjusting the position thereof along the guide groove 4. A C-shaped spacer 9 is interposed between the chuck body 5 and the set ring 8. The spacer 9 may be changed with another spacer depending upon different positions of the chuck body 5 according to the crankshaft to be worked. The drive spindle 1 is formed with a through bore 10 centrally, in which a rotary shaft 11 is penetrated through a supporting sleeve 12. The rotary shaft 11 has its one or rear end thereof connected with indexable drive means and phase indexing recognition mechanism which will be described later, and its other or front end thereof projecting into a recess 17 formed in the rear part of the chuck body 5. Reference numeral 21 denotes an index plate which is rotatably mounted in the chuck body 5 through a bushing 22 at an eccentric position with respect to the axis of the spindle 1. To one end of the index plate 21 is keyed a first gear 14 which meshes with an idler gear 13 (see FIG. 2), which in turn meshes with a second gear 16 keyed to one end of the rotary shaft 11. Thus as the rotary shaft 11 is indexably rotated by the indexable drive means, such rotation is transmitted through the second gear 16, idler gear 13 and first gear 14 to the index plate 21.

Reference character 15 denotes a movable plate which is rotatably carried by the bushing 22 and axially locked by set bolts 18 (see FIG. 2), the idler gear 13 being rotatably mounted on the movable plate 15. As shown in FIG. 2, the plate 15 is urged counter-clockwise direction by a tension spring 19, so that when an adjusting screw 20 mounted on the chuck body 5 is turned in the unscrewing direction, the plate 15 is rotated counter-clockwise under the resilience of the spring 19, while when the adjusting screw 20 is tightened, the plate 15 is rotated clockwise against the action of the spring 19, thereby bringing the idler gear 13 into its meshing position with the second gear 16.

For use with the crankshaft, such as a four cylinder engine, for example, the outer periphery of the index plate 21 is formed with a pair of notches 24 at positions having a phase difference of 180° with each other, the notches 24 being engaged by a stop member 26 slidably received in the chuck body 5 and normally urged by a spring 25. The front portion of the chuck body 5 is provided with a supporting block 27 in which a crankshaft 28 is received with its journal portion 29 coaxially aligned with the axis of the index plate 21 and with the axis of a crank pin 30 coaxially aligned with the axis of the spindle 1. At one end of the crankshaft 28, there is an engaging member 32 integrally mounted thereon by means of set screw 33, the member 32 carrying engaging pins 31, 31 which are adapted to engage openings 35, 35 in an engaging member 34 that is integrally mounted on the index plate 21. As a consequence, when the index plate 21 is indexably rotated, such rotation is transmitted to the crankshaft 28 through the both engaging members 34, 32, whereby the crankshaft 28 is indexably rotated about the journal portion 29 from an angular position in which the crank pin 30 shown has its axis aligned with the axis of the spindle 1 to an angular position in which another crank pin (not shown) positioned at a different phase angle moves into alignment with the axis of the spindle 1.

As best shown in FIG. 3, the front portion of the chuck body 5 is formed with a cylinder 36 for opening and closing a clamp arm. A piston 37 is slidably fitted in the cylinder 36, and to the piston rod 38 of the piston 37 is pivotally connected one end of the clamp arm 40 that is hinged at pin 39 to the chuck body 5. A tension spring 42 extending between the piston 37 and a cylinder cap 41 urges the piston 37 to the left, thereby opening the clamp arm 40. Reference characters 43 denote bolts which are used to secure the chuck body 5 to the front surface of the spindle 1, the bolts 43 extending through elongate slots 44 formed in the chuck body 5.

FIG. 4 shows an example of indexable drive means for indexably rotating the index plate 21 through the rotary shaft 11. Referring to this Figure more specifically, the drive spindle 1 is better shown in this Figure to be rotatably supported within the headstock 2 by means of bearing members 3, 3. A chain wheel 45 is keyed to the spindle 1. A synchronous drive shaft 46 has another chain wheel 47 keyed thereto, and a chain 48 extends around the both chain wheels 45, 47. A pulley 49 is keyed to one end of the drive shaft 46 and is adapted to be supplied with rotative power from a rotating drive means (not shown) through belts 50. The rotary shaft 11 housed in the through bore 10 of the drive spindle 1 and supported at its front end by the sleeve 12 is similarly supported at its rear end by a sleeve 51 attached to the spindle 1. The rear part of the rotary shaft 11 is releasably connected through an electromagnetic clutch 52 with a rotating cylinder 53. When the clutch 52 is energized to connect the rotating cylinder 53 with the rotary shaft 11, the rotation of the cylinder 53 is transmitted through the shaft 11 to rotate the indexing plate 21, thereby permitting the indexing of the crankshaft 28 at correct phase intervals. A distributor 54 is provided for the supply of pressure fluid to the cylinder 36 that controls the opening and closing of the clamp arm 40, the supply of the pressure fluid being effected through the passageway including fluid passage 55, through bore 10 and fluid passage 56. A limit switch 57 is provided to recognize the phase indexing, and is disposed to be acted upon by an actuating sleeve 58. The actuating sleeve 58 is guided axially movably on the distributor 54 and is urged towards the spindle 1 by a spring 59. A slidable sleeve 62 is carried by the actuating sleeve 58 through a thrust bearing 61. Extending from the front surface of the slidable sleeve 62 at 180° offset positions or diametrically opposite positions are a pair of pins 63, 63, which are adapted to engage the groove 65 in an auxiliary plate 64 attached to the rear part of the spindle 1. Therefore, as the rotary shaft 11 is rotated by the rotating cylinder 53 for the purpose of the indexing, the slidable sleeve 62 which is slidably keyed to the shaft 11 is rotated integrally therewith, and after a rotation of the crankshaft 28 through a given angle preset for the indexing, the pins 63, 63 come opposite the groove 65, whereupon the actuating sleeve 61 is axially moved together with the slidable sleeve 62 by the resilience of the spring 59 to actuate the limit switch 57. Where the crankshaft 28 is provided with four crank pins, approximate switches 66, 66 are arranged so as to be operated by a metal plate 67 which is mounted on the rotary shaft 11 in order to provide a distinction between the first and fourth pins on one hand, and the second and third pins 180° offset thereto on the other. Thus, by means of the approximate switches 66, 66 and the limit switch 57, recognition of indexing operation may be realized.

In order to hold crankshafts such as shown at 28 and having varying eccentricity with the chuck described above in an indexable manner, the adjusting screw 20 is initially adjusted in its unscrewing direction, whereby the movable plate 15 is rotated counter-clockwise by the resilience of the spring 19 to move the idler gear 13 out of engagement with the second gear 16. In this position, the securing bolts 43 are adjusted in their unscrewing direction, thereby rendering the chuck body 5 movable with respect to the spindle 1. Then C-shaped spacer 9 is removed and the chuck body 5 is moved radially of the drive spindle 1 while adjusting the bolt 7. At this time, the index plate 21 rotatably mounted on the chuck body 5 moves also in the same direction. The movement of the chuck body 5 is stopped when the axis of the index plate 21 has been displaced a desired distance according to the crankshaft to be worked from the axis of the spindle 1. A C-shaped spacer 9 of size corresponding to the eccentricity of the crankshaft 28 for which the chuck position is being adjusted is chosen and replaced on the bolt 7 to position the chuck body 5. It will be noted that at this time the idler gear 13 is disengaged from the second gear 16 so that the vertical movement of the first gear 14 does not result in a rotative force to be imparted to the second gear 16. Now the securing bolts 43 are tightened to secure the chuck body 5 on the front surface of the spindle 1. The adjusting screw 20 is adjusted in its screwing direction to rotate the movable plate 15 clockwise against the resilience of the spring 19 so as to bring the idler gear 13 into meshing engagement with the second gear 16 again, thereby rendering the chuck body operable for the indexing operation.

From the foregoing description, it will be understood that the invention provides a chuck having flexibility to accommodate crankshafts with varying eccentricities by mere positional adjustment of the index plate, this being made possible by an arrangement which comprises an idler gear between the first gear on the adjustable index plate and having its axis aligned therewith, and the second gear on and aligned with the drive spindle.

It will be also appreciated that according to the invention, the idler gear is released from meshing engagement when the index plate is moved for adjustment, by movement of a member that rotatably carries the idler gear, so that when the index plate is moved, no relative angular movement occurs between the first and second gears, thereby eliminating the need to readjust the indexing recognition means and thus enabling the adjusting movement of the index plate to be completed rapidly.

What is Claimed is:

1. An indexing device for a crankshaft having a plurality of pins comprising a drive spindle rotatably mounted on a headstock, a chuck body radially adjustably mounted on said drive spindle for holding a journal portion of said crank shaft, adjusting means mounted on said drive spindle and operatively connected to said chuck body for radially adjusting said chuck body to accommodate crankshafts with varying eccentricities, an index plate rotatably mounted on said chuck body for indexing one of said pins to be worked, means for operatively connecting said crankshaft with said index plate, a rotary shaft rotatably mounted on said drive spindle, a first gear keyed to said index plate, a second gear keyed to said rotary shaft, and idler gear arranged between said first and second gears to be operatively engaged therewith, releasing means mounted on said chuck body for releasing said engagement between said second gear and said idler gear when the position of said chuck body is adjusted, and driving means operatively connected to said rotary shaft for driving said rotary shaft.

2. The indexing device for a crankshaft as claimed in claim 1, wherein said adjusting means comprises a support member secured to said drive spindle for rotatably supporting an adjusting bolt, and a spacer interposed between said chuck body and said support member, said adjusting bolt is threadedly engaged with said chuck body for adjusting the position of said chuck body relative to said drive spindle to accommodate crankshafts with varying eccentricities.

3. The indexing device for a crankshaft as claimed in claim 2, wherein said releasing means comprises a movable member rotatably mounted on said chuck body and coaxially aligned with said index plate, said idler gear is rotatably mounted on said movable member, whereby said engagement between second and idler gear is out of engagement when said movable member is rotated.

4. The indexing device for a crankshaft as claimed in claim 3, wherein said movable member is urged toward the disengaged direction of said idler gear with said second gear by means of resilent resilient means provided between said movable member and said chuck body, said chuck body provides a second adjusting bolt threadedly mounted thereon, said second adjusting bolt is operatively engaged with said movable member to mesh said idler gear with said second gear against the resilent force of said resilient means.

* * * * *